United States Patent Office 2,783,205
Patented Feb. 26, 1957

2,783,205

SUPPRESSION OF ACIDIC GAS EVOLUTION

John W. Brooks, Wenonah, and Ferdinand P. Otto, Woodbury, N. J., assignors to Socony Mobil Oil Company, Inc., a corporation of New York No Drawing. Continuation of application Serial No. 161,742, May 12, 1950. This application August 14, 1953, Serial No. 374,446

8 Claims. (Cl. 252—46.7)

This application is a continuation of our copending application, Serial No. 161,742, filed May 12, 1950, now abandoned.

This invention relates, broadly, to systems which slowly evolve acidic gases. It is more particularly concerned with stabilizing these systems against such evolution.

A "system which slowly evolves acidic gases," as contemplated herein, refers to a mixture of materials, or a solution, which undergoes gradual deterioration or decomposition, thus evolving small amounts of acidic gases. Such a system can be a solution or a suspension of somewhat unstable chemical compounds or reaction products in a solvent, such as water, mineral oil, alcohol, etc. It can also be an impure chemical or a mixture of two or more chemicals, such as is encountered in a reaction product. It must be clearly understood that the term "system" does not include a mixture or a solution of two or more reactants which react to produce copious quantities of acidic gases. Thus, for example, a solution of sodium sulfide in water will slowly evolve small amounts of hydrogen sulfide. It is a system within the contemplation of this invention. On the other hand, a mixture of sodium sulfide, iodine and water would not be considered a system herein, because the materials in this mixture react to produce hydrogen iodide gas.

As is well known to those familiar with the art, many substances tend to give off small amounts of acidic gases, such as hydrogen sulfide, hydrogen chloride, hydrogen cyanide and the like. Such gases are objectionable from several standpoints. They may corrode metal parts with which they come in contact. Likewise, their odor, particularly the odor of the hydrides of the elements of group VI–A of the periodic chart of the elements (hydrogen sulfide, hydrogen selenide and hydrogen telluride), is very disagreeable. Hydrogen cyanide is exceedingly dangerous from a toxological standpoint. Many depilatory preparations contain metal sulfides and hydrosulfides which have a tendency to give off small amounts of hydrogen sulfide. The odor thus produced causes a customer resistance to otherwise meritorious products.

Many organic sulfur-containing reaction products have been proposed for addition to mineral lubricating oils to improve the oxidation stability and/or extreme pressure characteristics thereof. For example, the reaction product of α-pinene with phosphorus pentasulfide has been proposed as an antioxidant for mineral oils. Such additives, however, usually evolve hydrogen sulfide, both during use and during storage, regardless of whether they have been blended in a mineral oil or not. This is disadvantageous from several standpoints. The hydrogen sulfide can corrode bearing surfaces and other metal parts with which it comes into contact. Also, when hydrogen sulfide is formed, the additive may be destroyed, thus depriving the lubricant of the improved characteristics imparted to it by the additive. From a commercial standpoint, the odor of the hydrogen sulfide evolving from additives, or from lubricants containing them, is very undesirable. Likewise, the buildup of gas pressure, due to the formation of hydrogen sulfide, presents a constant danger of explosions during the shipping and handling of sealed containers containing such additives.

In accordance with the present invention, it has now been discovered that systems which slowly evolve small amounts of acidic gases can be stabilized against such an occurrence. It has now been found that the addition of minor amounts of condensation products of certain aldehydes with ammonia, to such systems, effectively suppresses the evolution of acidic gases therefrom.

Accordingly, it is a broad object of the present invention to provide a method for suppressing the evolution of acidic gases from systems which slowly evolve them. Another object is to provide a system in which the gradual evolution of acidic gases therefrom is suppressed. A further object is to provide a method for inhibiting the evolution of acidic gases from an aqueous system. A further, specific object is to provide organic phosphorus- and sulfur-containing additives containing minor amounts of condensation products of certain aldehydes with ammonia; and to provide mineral lubricating oils containing such stabilized additives. Other objects and advantages of the present invention will become apparent to those skilled in the art from the following detailed description.

Broadly stated, the present invention provides a method for suppressing the evolution of acidic gases from a system from which they are gradually evolved, which comprises adding to the system a condensation product obtained by reacting a pair of reactants selected from the group of pairs consisting of an aldehyde and a primary amine; a ketone and a primary amine; a heterocyclic aldehyde and ammonia; an aromatic aldehyde and ammonia; and formaldehyde and ammonia. This invention also provides a mineral lubricating oil containing a minor amount, sufficient to improve the oxidation characteristics thereof, of an oil-soluble organic sulfur-containing reaction product and between about 0.001 percent and about 20 percent, by weight, of a condensation product obtained by reacting a pair of reactants selected from the aforementioned group of pairs of reactants; and the oil-soluble organic sulfur-containing reaction products containing such a condensation product.

As is well known to those familiar with the art, many inorganic salts evolve acidic gases when they are dissolved or suspended in water, alcohol or other polar solvents. Acidic gases are also evolved when such salts are exposed to air containing carbon dioxide and/or water. Such salts are, by way of non-limiting examples, sodium hydrosulfide, sodium sulfide, calcium hydrosulfide, barium sulfide, potassium cyanide, sodium polysulfide, calcium polysulfide, barium hydrosulfide, barium polysulfide, strontium sulfide, strontium polysulfide, strontium hydrosulfide, lithium hydrosulfide, ammonium sulfide, ammonium polysulfide, ammonium hydrosulfide, potassium sulfide, potassium polysulfide, potassium hydrosulfide, magnesium sulfide, magnesium hydrosulfide and magnesium polysulfide. A system containing such salts can be a solution of the salt in a polar solvent or a suspension therein. Likewise, it can be a solid or fluid emulsion containing such salts, such as, for example, a depilatory cream containing a metallic sulfide. Such solutions and emulsions which gradually evolve acidic gases are well known to the art and need not be described in detail herein. The evolution of acidic gases from these systems can be suppressed by adding thereto a small amount of one of the aforementioned condensation products.

Many organic reaction products evolve acidic gases to varying extents, regardless of whether or not they are in solution or suspension in a vehicle. Such products are those containing halogen atoms, sulfur atoms, phosphorus and sulfur atoms, nitrile groups, etc. Such reaction products are considered to be systems from which the evolution of acidic gases can be suppressed in accordance with this invention. Likewise, solutions or suspensions of these reaction products in vehicles, such as mineral oils, light petroleum solvents, benzene, animal and vegetable fats and oils, emulsions of the foregoing solvents, etc., are systems within the contemplation of this invention. It will be appreciated that the evolution of acidic gases from vehicles containing such reaction products can be suppressed either by adding one of the condensation products of this invention thereto, or by adding a condensation product to the reaction product before it is added to the vehicle. Thus, the vehicle itself is not considered a contributing factor to suppressing the evolution of acidic gases.

Non-limiting examples of the organic reaction products referred to herein are described in a number of United States patents. These will be described briefly, although it must be clearly understood that the patents are to be consulted for more detailed information. Accordingly, the specifications of these patents are to be considered to be part of this specification.

In U. S. Patent No. 1,963,489, Fuller et al, disclose the addition of dialkyl disulfides to mineral oils. The use of sulfurized pine oil is set forth in U. S. Patent No. 2,012,446, to Edwards et al. Reiff describes reaction products of phenols, sulfur and chlorinated wax in U. S. Patents Nos. 2,061,008 and 2,062,676. U. S. Patent No. 2,081,886, to Story et al., relates to the use of disulfides of organic compounds. Evers, in U. S. Patent No. 2,088,193, describes the reaction product of stannic chloride and a mercaptan-containing organic acid. The dixanthyl ethyl ethers are described by Moran, in U. S. Patent No. 2,133,828. U. S. Patent No. 2,137,410, to Moran et al., relates to sulfurized terpenes. Berger et al. describe polychlorinated aliphatic compounds in which part of the chlorine has been replaced by a thiocarbonate group in U. S. Patent No. 2,153,496. U. S. Patent No. 2,161,566, to Fuller et al., relates to alkyl esters of alkyl xanthates. Moran et al., in U. S. Patent Nos. 2,162,207 and 2,162,208, disclose arylamino polysulfides and aniline disulfide in mineral oil. The reaction product of an arylamine and sulfur is described by Crandall et al. in U. S. Patent No. 2,164,151. The reaction product of mineral oils or fatty oils with phosphorus compounds, including phosphorus sulfides, is described in U. S. Patent No. 2,142,998, to Chittick; U. S. Patent No. 2,169,634, to Cantrell et al., relates to the reaction product of $P_4S_3$ with water-insoluble reaction products of phenols and olefins. A reaction product of the aforedescribed phenol-olefin reaction product with $P_2S_5$ and/or $PCl_3$ is described by Cantrell et al. in U. S. Patent No. 2,226,334. Hamilton et al. disclose the reaction product of sulfur chloride with extracts obtained from solvent-refining of petroleum in U. S. Patent No. 2,193,331. The reaction product of a perchloromethyl mercaptan and an unsaturated organic compound is described by Badertscher et al. in U. S. Patent No. 2,197,781. U. S. Patent No. 2,202,641, to Badertscher et al. relates to the reaction product of an alkali thiocyanate and a halogenated organic compound. Organic disulfides are disclosed by Story et al. in U. S. Patent No. 2,211,798. In U. S. Patent No. 2,218,447 Badertscher described the reaction product of an aliphatic amine and sulfur dichloride. U. S. Patent No. 2,228,252 to Berger et al. relates to the use of perchloromethyl mercaptans. Reiff describes sulfides of metal salts of alkyl-substituted hydroxyaromatic carboxylic acids in U. S. Patent Nos. 2,256,441 and 2,256,443. The reaction product of SCl or SCl and $PCl_3$ with phenol olefins (see U. S. Patent No. 2,253,227) is described by Cantrell et al. in U. S. Patent No. 2,253,228. U. S. Patent No. 2,260,303 to Engelke relates to sulfurized organic phosphines. Sulfurized cresyl phosphate or phosphite is set forth in U. S. Patent No. 2,301,918 to Morgan. Williams discloses a reaction product obtained by reacting a fatty oil with a phosphorus sulfide and then with sulfur monochloride in U. S. Patent No. 2,274,022. The reaction product of halogenated aliphatic, aromatic or terpene compounds with a phosphorus sulfide has been described in U. S. Patent No. 2,307,183 to Zimmer et al. Polymeric monoolefins have been reacted with a phosphorus sulfide by Loane et al. in U. S. Patent No. 2,316,078. In U. S. Patent No. 2,316,081, Loane et al. disclose the reaction product of an aromatic hydrocarbon or of a mineral oil fraction containing it with a phosphorus sulfide. A product derived by reacting a phosphorus sulfide with a high molecular weight compound capable of increasing the viscosity index of a mineral oil has been defined by Kelso et al. in U. S. Patent No. 2,316,085. MacClaren, in U. S. Patent No. 2,316,086, discloses the reaction of a halogenated, aliphatic hydrocarbon with an aromatic compound to obtain a reaction product which is further reacted with a phosphorus sulfide. U. S. Patent No. 2,316,087, to Gaynor et al., discloses the treatment of hydrocarbon or olefin polymers with a phosphorus sulfide. In U. S. Patent No. 2,316,088, Loane et al. broadly describe the reaction of a hydrocarbon with a phosphorus sulfide. A reaction product obtained by copolymerizing a low molecular weight monoolefin with a more unsaturated olefin, such as a conjugated diolefin, and then reacting the copolymer with a phosphorus sulfide, is disclosed in U. S. Patent No. 2,316,089 to Anderson. In U. S. Patent No. 2,283,494, Moran et al. have described the reaction of phosphorus pentasulfide with unsaturated aliphatic ketones. In U. S. Patent No. 2,383,497, Otto et al. disclose the reaction product of phosphorus pentasulfide with sulfurized dioleyl ketone. The reaction product of phosphorus pentasulfide with an alkyl-substituted phenol is set forth in U. S. Patent No. 2,386,207 to Reiff et al. Williams et al. disclose the reaction product of an olefinic alcohol derived from petroleum with phosphorus pentasulfide in U. S. Patent No. 2,388,199. In accordance with U. S. Patent No. 2,393,394 to Reiff et al., a reaction product is obtained by reacting a phosphorus sulfide with an amide of an alkyl-substituted aromatic carboxylic acid. In U. S. Patent No. 2,411,153, Fuller et al. teach the reaction product of oleyl alcohol with phosphorus pentasulfide. The reaction product of phosphorus pentasulfide and oxidized paraffin wax is described by Fuller et al. in U. S. Patent No. 2,427,272. Reiff et al., in U. S. Patent No. 2,441,331, teach that a reaction product is obtained by reacting a phosphorus sulfide with a phosphorus amine of an alkyl-substituted hydroxyaromatic compound. The reaction products of alkyl halides with a phosphorus sulfide are disclosed in U. S. Patent Nos. 2,449,933 and 2,449,934, to Giammaria. Berger et al. describe reaction products of thermal recycle stocks with phosphorus pentasulfide in U. S. Patent No. 2,450,405. The reaction product of phosphorus pentasulfide and a sulfurized ketone is prepared in accordance with the disclosure of U. S. Patent No. 2,459,090 to Otto et al. In U. S. Patent No. 2,459,113, Oberright teaches that a reaction product is produced when the product obtained from reacting a hydroxyaromatic compound, an aldehyde and a polyamine is reacted with a phosphorus sulfide.

All of the reaction products described in these patents tend to evolve acidic gases. Accordingly, they are contemplated to be within the scope of the present invention as reaction products which can be stabilized against the evolution of such gases.

Of especial interest are the oil-soluble, phosphorus- and sulfur-containing reaction products obtained by reacting a dicyclic terpene with a phosphorus sulfide, at a temperature above about 100° C. Any one of the several known phosphorus sulfides, such as, for example, $P_3S_6$ (or $PS_2$), $P_4S_6$ (or $P_2S_3$), $P_4S_3$, $P_2S_5$ (or $P_4S_{10}$), $P_4S_7$, etc., can be used to prepare these reaction products. However, $P_2S_5$ is especially preferred.

"Dicyclic terpenes" are defined as those terpenes which are characterized by the presence of one double bond in the molecule and which are comprised of two ring systems. Typical of such terpenes are pinene, camphene and fenchene. Also contemplated are those materials which are composed predominantly of one or more dicyclic terpenes. Representative of such materials are the essential or volatile oils, typically, turpentine, the predominant constituent of which is pinene. The reaction products of particular interest are those obtained from $P_2S_5$ and pinene and $P_2S_5$ turpentine.

As set forth in U. S. Patent No. 2,476,972, to Everett W. Fuller et al., the reaction temperature used to produce these reaction products should be at least about 100° C., and, preferably, between about 100° C. and about 160° C. The molar proportion of dicyclic terpene to phosphorus sulfide should be about 4:1, respectively, to produce a reaction product which is effective and which is readily soluble in petroleum oils. Another procedure utilizable to prepare these reaction products is to blend a dicyclic terpene in a comparatively inert solvent, such as a petroleum oil, and to react the blend with a phosphorus sulfide, as described hereinbefore and in the patent referred to.

The organic reaction product can contain other substances which are added thereto for various purposes. The disclosures of the following United States patents furnish non-limiting examples of combinations of this type. The combination of dibenzyl sulfide and a sulfide of a hydroxyaromatic compound is disclosed by Story et al. in U. S. Patent No. 2,028,257. Smith describes a combination of a sulfurized monoester of a fatty acid and an oil-soluble ester of an acid of phosphorus in U. S. Patent No. 2,231,301. U. S. Patent No. 2,252,133, to Morway et al., relates to the combination of a mildly sulfurized mineral oil and an ester of an acid of phosphorus. The combination of sulfurized mineral oil with an E. P. base is defined by Kaufman in U. S. Patent No. 2,296,037. U. S. Patent No. 2,315,072, to Nelson et al., relates to the combination of organic sulfides and corrosion inhibitors. In U. S. Patent No. 2,373,094, Berger et al. describe a combination of an alkyl phenol with the reaction product of a phosphorus sulfide and a thermal recycle stock. Noland teaches the combination of this reaction product with a sulfonate, in U. S. Patent No. 2,419,584. U. S. Patent No. 2,416,281, to Berger et al., discloses the combination of a metal sulfonate with the reaction product of a dicyclic terpene and a phosphorus sulfide. The combination of metal sulfonates or metal carboxylates with the reaction product of oleyl alcohol and phosphorus pentasulfide is disclosed in U. S. Patent No. 2,442,915, to Berger et al. A dicyclic terpene-phosphorus sulfide reaction product and a hydroxyaromatic ester of an organic carboxylic acid are disclosed in combination by Fuller et al. in U. S. Patent No. 2,455,668. In accordance with U. S. Patent No. 2,476,972 to Fuller et al., a dicyclic terpene-phosphorus sulfide reaction product is used in conjunction with an oil-soluble magnesium sulfonate detergent.

The organic reaction products are added to mineral lubricating oils in concentrations sufficient to stabilize the oils against oxidation, etc. Usually, such amounts vary between about 0.01 percent and about 10 percent, by weight. Reference should be made to the patents cited for specific preferred concentrations for each additive.

Any aldehydes or ketones can be reacted with a primary amine to produce condensation products utilizable for the purposes of the present invention. The compounds contemplated have the formulae RCHO and RCOR', wherein R and R' can be aliphatic radicals, branched-chain or straight-chain, saturated or unsaturated; cycloaliphatic radicals; aromatic radicals; heterocyclic radicals; or aryl-substituted aliphatic, cycloaliphatic or heterocyclic radicals. Such aldehydes or ketones can contain other substituent groups, such as halogen, amino, nitro and the like. Non-limiting examples of these aldehydes and ketones are acrolein, crotonaldehyde, benzaldehyde, chlorobenzaldehyde, furfural, mesityl oxide, chlorosalicyl aldehyde, phorone, benzophenone, p-nitrobenzalacetophenone, o-nitrobenzaldehyde, o-tolualdehyde, p-tolualdehyde, p-methoxybenzophenone, ω-aminoacetophenone, salicylaldehyde, p-hydroxybenzaldehyde, anisaldehyde, p-methoxybenzalacetone, m-aminoacetophenone, m-aminobenzaldehyde, β-indole aldehyde, aminobenzophenone, cinnamaldehyde, 2-thenyl aldehyde, m-nitroacetophenone, acetophenone, β-pyrrole aldehyde, naphthaldehyde, anthraldehyde, propiophenone, iso-butyrophenone, valerophenone, caprophenone, iso-caprophenone, di-p-tolyl ketone, acrylone, methylbenzophenone, p-nitrobenzophenone, o-hydroxyacetophenone, p-hydroxypropiophenone, p-methoxyacetophenone, acetaldehyde, butyraldehyde, acetone, nitrosoacetone, 2-ethylhexanaldehyde, heptanaldehyde, methyl ethyl ketone, ethyl amyl ketone, cyclohexanone, stearic aldehyde, aminoacetone, hydroxyacetaldehyde, oleone, stearone, behenone, melissone, hydroxybutyraldehyde, undecylenone, brassidone, eicosanaldehyde, triacontanaldehyde, decenaldehyde, tricosenaldehyde, phenylacetaldehyde, methyl benzyl ketone and phenylpropionaldehyde.

The aldehydes which react with ammonia to produce condensation products which are effective for the purposes of the present invention are the aromatic aldehydes, the heterocyclic aldehydes and formaldehyde. Non-limiting examples of these aldehydes are benzaldehyde, furfuraldehyde, chlorosalicylaldehyde, o-nitrobenzaldehyde, o-tolualdehyde, p-tolualdehyde, salicylaldehyde, p-hydroxybenzaldehyde, anisaldehyde, 2-thenylaldehyde, naphthaldehyde, anthraldehyde, β-pyrrole aldehyde and β-indole aldehyde.

The amine reactants which are condensed with the aldehydes and ketones to produce products effective for the purposes of this invention are the primary amines, i. e., the organic nitrogen compounds having the formula $RNH_2$, wherein R is a hydrocarbon group or a heterocyclic group. The aromatic primary amines are those amines wherein R is an aromatic nucleus. When an aromatic nucleus is substituted in an aliphatic chain of an aliphatic amine, the amine is considered to be an aliphatic rather than an aromatic amine. Non-limiting examples of the primary amines are aniline, o-toluidine, p-toluidine, m-nitroaniline, p-t-amylaniline, o-anisidine, m-anisidine, p-anisidine, p-phenetidine, p-bromo-aniline, α-anthramine, β-anthramine, α-naphthylamine, β-naphthylamine, carvacylamine, aminonaphthol, 2-ethylhexylamine, tetradecylamine, thiophenine, methylamine, ethylamine, propylamine, ethanolamine, hexylamine, octylamine, dodecylamine, hexadecylamine, octadecylamine, octadecenylamine, octadecadienylamine, abietylamine, hexadecenylamine, β-phenylethylamine, aminomenthane, amylamine, cyclohexylamine, aminofuran, aminopyridine, aminoindole, eicosylamine, tetracosenylamine, triacontylamine and the polyamines, such as tetraethylenepentamine, diethylenetriamine, ethylene diamine, propylene diamine and the like.

It must be strictly understood that it is not necessary, however preferable, that the aldehyde, ketone and amine reactants contemplated herein be pure compounds. They can be of commercial grade or they can be commercial mixtures of compounds. Likewise, it is within the scope of this invention to use mixtures of one or more pure aldehydes, ketones or amines.

It may be postulated that the condensation of aldehydes and ketones proceeds with the formation of products related structurally to the Schiff bases, in accordance with the general equations:

(1) 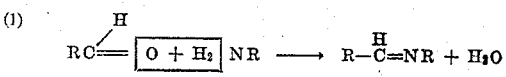

(2) 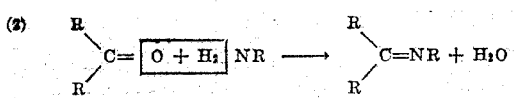

However, there is no evidence that such a reaction occurs in all cases. In fact, some of the condensations (1) of aliphatic aldehydes and aliphatic amines and (2) of aliphatic aldehydes and aromatic amines were not accompanied by the formation of water. Although it is postulated that the presence of the group

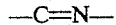

is necessary in the molecule, it has been found that the presence of this group is not the only requisite. Many compounds which contain this group, such as 2-mercaptobenzothiazole, cyanuric acid, α-picoline, quinoline, pyrrole, pyridine, benzaldehyde phenyl hydrazone and benzaldehyde oxime, were found to be ineffective for the purposes of the present invention. Accordingly, it will be appreciated that any designation of these condensation products, other than a definition comprising the method for producing them, is not accurately descriptive of them.

Most aldehydes condense with amines readily at temperatures of about 20–100° C. It has been found, however, that some aldehydes do not react completely with certain amines. In such a case, the unreacted reactants must be removed, or else the actual amount of condensation product in such an incompletely reacted product must be taken into consideration when calculating the amount of condensation product to be added to a system. For example, it was found that when an aliphatic aldehyde, such as 2-ethylhexanaldehyde, and an aromatic amine, such as o-toluidine, were condensed, only about 10–20 percent reaction occurred. Thus, when tests were conducted using 3 percent of this product in a pinene-$P_2S_5$ product, no suppression of hydrogen sulfide evolution was effected, due to the fact that only about 0.3 percent of the desired condensation product was actually present. The unreacted reactants were then removed, and it was found that 3 percent of the undiluted condensation product was effective to suppress hydrogen sulfide evolution in a similar system. However, the condensation of ketones with amines is more difficult to effect. This condensation ordinarily takes place at temperatures of about 75–125° C. An acid catalyst, such as zinc chloride or iodine, is used ordinarily.

The condensation of aromatic and heterocyclic aldehydes with ammonia produces hydroamides in accordance with the equation:

(3) 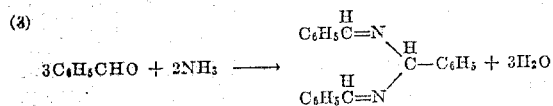

The product of reaction 3 is called hydrobenzamide. As mentioned hereinbefore, the condensation products of any aromatic or heterocyclic aldehyde with ammonia are effective for the purposes of the present invention. Condensation products of ketone with ammonia are not utilizable herein. Likewise, condensation products of aliphatic aldehydes with ammonia are not utilizable herein with the exception of the reaction product of formaldehyde and ammonia. The condensation products of aromatic and of heterocyclic aldehydes with ammonia are produced readily at temperatures of about 20–100° C.

It will be noted that, among the foregoing non-limiting examples of aldehydes and ketones, there were included aldehydes and ketones containing a primary amino group. Such compounds can function both as the amine reactant and as the aldehyde or ketone reactant, permitting a condensation product to be formed from two molecules of like or unlike amino-aldehydes or ketones.

Non-limiting examples of pairs of reactants which produce the condensation products of aldehydes with ammonia or with primary amines and of ketones with primary amines, which are utilizable in accordance with this invention, to suppress the evolution of acidic gases from systems which evolve them are acrolein and aniline; crotonaldehyde and o-toluidine; benzaldhyde and p-toluidine; chlorobenzaldehyde and m-toluidine; furfurallehyde and m-nitroaniline; mesityl oxide and p-t-amylaniline; chlorosalicylaldehyde and o-anisidine; phorone and m-anisidine; benzophenone and p-anisidine; p-nitrobenzalacetophenone and p-phenetidine; o-tolualdehyde and p-bromoaniline; o-nitrobenzaldehyde and α-anthramine; p-tolualdehyde and β-anthramine; p-methoxybenzophenone and α-naphthylamine; ω-aminoacetophenone and β-naphthylamine; salicylaldehyde and carvacrylamine; p-hydroxybenzaldehyde and aminonaphthol; anisaldehyde and 2-ethylhexylamine; p-methoxybenzalacetone and tetradecylamine; m-aminoacetophenone and thiophenine; m-aminobenzophenone and ethylamine; cinnamaldehyde and propylamine; 2-thenyl aldehyde and ethanolamine; m-nitroacetophenone and hexylamine; β-indole aldehyde and p-t-amylaniline; acetophenone and octylamine; naphthaldehyde and dodecylamine; anthraldehyde and octadecylamine; propiophenone and octadecadienylamine; β-pyrrole aldehyde and o-toluidine; isobutyrophenone and abietylamine; valerophenone and hexadecenylamine; caprophenone and β-phenylethylamine; isocaprophenone and aminomenthane; di-p-tolyl ketone and amylamine; acrylone and tetracosenylamine; methylbenzophenone and eicosylamine; p-nitrobenzophenone and aminoindole; o-hydroxyacetophenone and aminopyridine; p-hydroxypropiophenone and aminofuran; p-methoxyacetophenone and cyclohexylamine; acetaldehyde and triacontylamine; butyraldehyde and 2-ethylhexylamine; acetone o-toluidine; nitrosoacetone and thiophenine; 2-ethylhexanaldehyde and octadecylamine; heptanaldehyde and octadecenylamine; methyl ethyl ketone and aniline; ethyl amyl ketone and ethanolamine; cyclohexanone and hexylamine; stearic aldehyde and octylamine; aminoacetone and dodecylamine; hydroxyacetaldehyde and hexadecylamine; oleone and methylamine; stearone and ethylamine; behenone and propylamine; melissone and β-phenylethylamine; hydroxybutyraldehyde and abietylamine; undecylenone and amylamine; brassidone and aminofuran; eicosanaldehyde and aminopyridine; triacontanaldehyde and aminoindole; decenaldehyde and p-bromoaniline; methyl benzyl ketone and tetracosenylamine; phenylpropionaldehyde and triacontylamine; phenylacetaldehyde and 2-ethylhexylamine; tricosenaldehyde and propylamine; benzaldehyde and aniline; benzaldehyde and p-t-amylaniline; benzaldehyde and o-toluidine; benzaldehyde and tetradecylamine; benzaldehyde and 2-ethylhexylamine; furfuraldehyde and o-toluidine; 2-thenyl aldehyde and o-toluidine; cinnamaldehyde and o-toluidine; 2-ethylhexaldehyde and 2-ethylhexylamine; heptaldehyde and tetradecylamine; acetophenone and o-toluidine; benzophenone and o-toluidine; benzaldehyde and ammonia; furfuraldehyde and ammonia; chlorosalicylaldehyde and ammonia; o-nitrobenzaldehyde and ammonia; o-tolualdehyde and ammonia; p-tolualdehyde and ammonia; salicylaldehyde and ammonia; p-hydroxybenzaldehyde and ammonia; anisaldehyde and ammonia; m-aminobenzaldehyde and ammonia; 2-thenyl aldehyde and ammonia; β-pyrrole aldehyde and ammonia; naphthaldehyde and ammonia; anthraldehyde and ammonia; β-indole aldehyde and ammonia; ω-aminoacetophenone and ω-aminoacetophenone; m-aminobenzaldehyde and aminoacetone; aminobenzophenone and aminobenzophenone; ω-aminoacetophenone and m-aminobenzaldehyde; m-aminobenzaldehyde; m-aminoacetophenone and aminoacetone; and aminoacetone and aminoacetone.

These non-limiting examples of condensation products utilizable herein are not all exactly equivalent in their effect. Larger amounts of some of them will be necessary in some instances. However, these condensation products are effective within the scope of the present invention.

The effective concentration of the condensation products utilizable herein is dependent on several factors, such as the particular system used and the rate of acidic gas formation therein. When the condensation product is added to a relatively concentrated system, such as a lubricating additive, it is used in amounts varying between about 0.5 and about 20 weight percent. If, on the other hand, the condensation product is added to a more dilute system, such as a lubricating oil composition or an aqueous solution, a lesser amount of the condensation product is required, namely, between about 0.001 percent and about 1 percent, based on the weight of the system. Accordingly, in general, the concentration of the condensation product varies between about 0.001 percent and about 20 percent, dependent on the considerations discussed hereinbefore.

The following specific examples are for the purpose of demonstrating the effectiveness of the condensation products of this invention in suppressing the evolution of acidic gases from systems from which they evolve. It must be strictly understood, however, that the invention is not to be limited to the specific condensation products or to the specific systems used therein. As will be apparent to those skilled in the art, a wide variety of other condensation products and systems, as set forth hereinbefore, can be used in accordance with this invention.

The method used for evaluating the condensation products contemplated in this invention was as follows: The desired amount of condensation product was added to a system, such as a pinene-$P_2S_5$ product, produced in a 4:1 molar ratio as described in U. S. Patent No. 2,476,972. Then, the mixture was heated at 80–100° C., with stirring, for a few minutes to produce a homogeneous system. Each system was then placed in a stoppered, 4-ounce, clear, glass bottle, filling the bottle about halfway, and placed in storage at a place where it was exposed to sunlight. Each bottle was tested, at intervals, for the evolution of hydrogen sulfide, by placing a piece of moistened lead acetate paper in the bottle directly above the liquid surface for five seconds. The amount of hydrogen sulfide evolved was determined by the appearance of the lead acetate paper, in accordance with the following numerical rating:

(1) $H_2S$ very strong—lead acetate paper blackened immediately
(2) $H_2S$ strong—lead acetate paper blackened after 5 seconds
(3) $H_2S$ medium—lead acetate paper browned after 5 seconds
(4) $H_2S$ weak—lead acetate paper turned light tan after 5 seconds
(5) $H_2S$ negative—lead acetate paper did not color in 5 seconds In applying this test, a rating of 1 or 2 is considered ineffective.

It will be noted that, among the following examples, there were used commercial mixtures of amines. In the tables for the sake of brevity, they are referred to by their trade names. The "Armeens" used herein are mixtures of primary amines sold by Armour and Co., Chicago, Illinois, and produced by a process involving converting mixtures of fatty acids to nitriles and catalytically hydrogenating them to primary amines under alkaline conditions and at temperatures below 150° C. In Table I are set forth the approximate analyses of the "Armeens" used, expressed in weight percent of amines of each chain length, together with their code designation, as given by the manufacturer.

TABLE I

| Primary amine, wt. percent | Armeen C [1] | Armeen CD [2] | Armeen TD [3] | Armeen SD [4] |
|---|---|---|---|---|
| Octyl | 8 | 8 | | |
| Decyl | 9 | 9 | | |
| Dodecyl | 47 | 47 | | |
| Tetradecyl | 18 | 18 | | |
| Hexadecyl | 8 | 8 | 30 | 10 |
| Octadecyl | 5 | 5 | 25 | 10 |
| Octadecenyl | 5 | 5 | 45 | 35 |
| Octadecadienyl | | | | 45 |

[1] Obtained from coconut oil.
[2] Obtained from coconut oil and distilled.
[3] Obtained from tallow.
[4] Obtained from soy bean oil.

Rosin Amine–D is a primary amine made from rosin by the Hercules Powder Co., Wilmington, Delaware. According to the manufacturer, this product is essentially a mixture of primary amines having, as the main component, an amine of the structure:

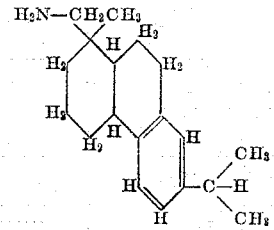

This mixture of rosin amines is a pale yellow to colorless liquid having a specific gravity of 0.9952, a refractive index (20° C.) of 1.5410, a neutralization equivalent of 318, a purity of 85–95 percent and boiling at 152–177° C. at 1 mm., 187–211° C. at 5 mm., 203–227° C. at 10 mm., 308–325° C. at 300 mm., or at 344° C. at atmospheric pressure.

*Examples 1 and 2*

Blends of hydroamides, derived by condensing aldehydes with ammonia, in pinene-$P_2S_5$ reaction product were tested over a period of four months of storage. The pertinent data for each product tested are set forth in Table II.

TABLE II

| Condensation product added to pinene-$P_2S_5$ product | Concn., wt., percent | Test results | | | |
|---|---|---|---|---|---|
| | | 17 days' storage | 1 month storage | 2 months' storage | 4 months' storage |
| Nothing | | 1 | 1 | 1 | 1 |
| (1) Benzaldehyde and ammonia | 5 | | 5 | 5 | 5 |
| Do | 1 | | 4 | 3 | 3 |
| (2) Furfuraldehyde and ammonia | 3 | 5 | | | |
| Do | 2 | 5 | | | |

*Examples 3 through 25*

Condensation products of aldehydes with various primary amines were blended with portions of the pinene-$P_2S_5$ reaction product. The blends were tested for the evolution of hydrogen sulfide. Pertinent data therefore are set forth in Table III.

TABLE III

| Condensation product added to Pinene-P₂S₅ product | Concentrated weight percent | Test results | | | | |
|---|---|---|---|---|---|---|
| | | 15 days' storage | 20 days' storage | 1 month storage | 2 months' storage | 4 months' storage |
| (3) Benzaldehyde and aniline | 5 | 5 | | 5 | 5 | 4 |
| Do | 2 | 5 | | 5 | 5 | |
| Do | 1 | 5 | | 5 | 4 | 3 |
| Do | 0.5 | 3 | | 2 | 2 | 2 |
| (4) Benzaldehyde and p-t-amylaniline | 5 | | | 5 | 5 | |
| Do | 3 | | | 4 | 4 | |
| Do | 1 | | | 3 | 1 | |
| (5) Benzaldehyde and o-toluidine | 5 | | | 5 | 5 | |
| Do | 3 | | | 5 | 5 | |
| Do | 1 | | | 4 | 4 | |
| (6) Benzaldehyde and 2-ethylhexylamine | 5 | | | 5 | 5 | |
| Do | 3 | | | 5 | 5 | |
| (7) Benzaldehyde and decylamine | 5 | 5 | | | 5 | |
| Do | 3 | 5 | | | 5 | |
| (8) Benzaldehyde and tetradecylamine | 5 | | | 5 | 5 | 5 |
| Do | 3 | | | 5 | 5 | 5 |
| (9) Benzaldehyde and octadecylamine | 5 | 5 | | | 5 | |
| Do | 3 | 4 | | | 2 | |
| (10) Benzaldehyde and Armeen O | 5 | 5 | | | 5 | |
| (11) Benzaldehyde and Armeen CD | 5 | 5 | | | 5 | |
| Do | 3 | 4 | | | 3 | |
| (12) Benzaldehyde and Armeen SD | 5 | 5 | | | 5 | |
| Do | 3 | 4 | | | 2 | |
| (13) Benzaldehyde and Armeen TD | 5 | 5 | | | 5 | |
| Do | 3 | 4 | | | 3 | |
| (14) Benzaldehyde and rosin amine-D | 5 | | 5 | | | |
| Do | 3 | | 4 | | | |
| (15) Salicylaldehyde and 2-ethylhexylamine | 5 | 5 | | 5 | 4 | |
| Do | 1 | 3 | | 3 | 2 | |
| (16) Salicylaldehyde and diaminopropane | 5 | | 5 | | | |
| Do | 3 | | 5 | | | |
| Do | 1 | | 3 | | | |
| (17) Cinnamaldehyde and o-toluidine | 5 | | | 5 | | |
| Do | 3 | | | 3 | | |
| (18) Furfuraldehyde and aniline | 5 | | 5 | | | |
| Do | 3 | | 3 | | | |
| (19) Furfuraldehyde and o-toluidine | 5 | | | 5 | 4 | |
| Do | 3 | | | 5 | 2 | |
| Do | 1 | | | 3 | 1 | |
| (20) Thenylaldehyde and o-toluidine | 5 | | | 5 | | |
| Do | 3 | | | 5 | | |
| Do | 1 | | | 5 | | |
| (21) Heptanaldehyde and tetradecylamine | 5 | | 3 | | | |
| (22) Heptanaldehyde and decylamine | 5 | | | 3 | 2 | |
| Do | 3 | | | 2 | 1 | |
| (23) 2-ethylhexanaldehyde and 2-ethylhexylamine | 5 | | | 5 | 4 | |
| Do | 3 | | | 3 | 2 | |
| (24) 2-ethylhexanaldehyde and Armeen CD | 5 | | 3 | | | |
| (25) 2-ethylhexanaldehyde and o-toluidine | 5 | | 5 | | | |

*Examples 26 through 31*

Condensation products were prepared by condensing ketones with various primary amines. Pertinent data for blends of these condensation products with a pinene-P₂S₅ reaction product are set forth in Table IV.

TABLE IV

| Condensation product added to pinene-P₂S₅ product | Concn., Wt., Percent | Test Results | | | |
|---|---|---|---|---|---|
| | | 13 days' storage | 20 days' storage | 1 month storage | 2 months' storage |
| Nothing | | 1 | 1 | 1 | 1 |
| (26) Acetophenone and o-toluidine | 3 | | | 3 | |
| Do | 1 | | | 3 | |
| (27) Benzophenone and o-toluidine | 5 | | | 3 | |
| (28) Acetylthiophene and o-toluidine | 5 | 3 | | | 2 |
| Do | 2.5 | 4 | | | 5 |
| (29) Acetylthiophene and 2-ethylhexylamine | 5 | 3 | | | 3 |
| Do | 2.5 | 5 | | | 5 |
| (30) Methylisobutyl ketone and 2-ethylhexylamine | 5 | 4 | | | 2 |
| Do | 2.5 | 5 | | | 5 |
| (31) Methylisobutyl ketone and o-toluidine | 5 | | 4 | | |

*Example 32*

A condensation product was prepared from formaldehyde and ammonia, i. e., hexamethylenetetramine. A blend of 5 percent of this product in the pinene-P₂S₅ product had a rating of 3, after two months of storage.

*Examples 33 through 36*

Blends of organic sulfur-containing materials in lubricating oil were prepared. The mineral oil used was a solvent-refined Midcontinent stock having an A. P. I. gravity of 31.1, a flash point of 405° F., a Saybolt Universal Viscosity of 150 at 100° F., and a viscosity index of 99. Blend A contained 2 percent, by weight, of a blend of the pinene-P₂S₅ reaction product described hereinbefore with a barium wax benzene sulfonate. This additive has been described in U. S. Patent No. 2,476,972. Blend B contained one percent, by weight, of the aforedescribed pinene-P₂S₅ reaction product. Blend C contained 2 percent, by weight, of the aforedescribed pinene-P₂S₅ reaction product to which had been added 0.15 percent of water. The presence of water appears to accelerate the evolution of hydrogen sulfide. Various Schiff-type bases were added to these blends, as described in Table V. The test results given therein were obtained on prolonged storage. The same test procedure, as described hereinbefore, was used except that the lead acetate paper was held in the bottle for 10 seconds, instead of for 5 seconds.

The concentrations of condensation product used were percent by weight based on the weight of the lubricating oil blend.

TABLE V

| Blend+Condensation Product | Test results | |
|---|---|---|
| | 20 days' storage | 40 days' storage |
| Oil Blend A | 2 | |
| (33) Blend A+0.02% benzaldehyde and aniline | 5 | |
| (34) Blend A+0.02% benzaldehyde and o-toluidine | 5 | |
| Oil Blend B | | 4 |
| (35) Blend B+0.01% benzaldehyde and aniline | | 5 |
| Oil Blend C | | 2 |
| (36) Blend C+0.04% benzaldehyde and o-toluidine | | 5 |

*Examples 37 through 39*

In order to demonstrate the effectiveness of the method of the present invention in suppressing evolution of acidic gases from aqueous systems containing inorganic salts, three systems were inhibited with the condensation product of benzaldehyde and o-toluidine. The first system was a dilute aqueous solution (0.01 percent) of hydrogen sulfide. The second system was a one percent solution of sodium hydrosulfide in water. The third system was a one percent aqueous solution of calcium hydrosulfide. The concentration of evolved hydrogen sulfide was determined using the 5 second test described hereinbefore. Pertinent results are set forth in Table VI.

TABLE VI

| Component of aqueous system | Test results | |
|---|---|---|
| | 4 days' storage | 12 days' storage |
| 0.01% $H_2S$ | 1 | 1 |
| (37) 0.01% $H_2S$+0.1% benzaldehyde and o-toluidine product | 4 | 5 |
| 1% NaSH | 1 | 1 |
| (38) 1% NaSH+0.5% benzaldehyde and o-toluidine product | 3 | 3 |
| 1% Ca(SH)$_2$ | 1 | 1 |
| (39) 1% Ca(SH)$_2$+0.5% benzaldehyde and o-toluidine product | 3 | 3 |

It will be apparent that the addition of aldehyde- or ketone-amine condensation products or of aromatic or heterocyclic aldehyde or formaldehyde and ammonia condensation products, as defined herein, to systems which evolve hydrogen sulfide results in an effective suppression of the evolution of the hydrogen sulfide therefrom. Although this invention has been illustrated with respect to systems evolving hydrogen sulfide, when these condensation products are added to systems which evolve other acidic gases, as defined hereinbefore, equally effective suppression is attained. Such suppression results in many advantages, as have been discussed hereinbefore.

Although the present invention has been described with preferred embodiments, it is to be understood that modifications and variations may be resorted to without departing from the spirit and scope thereof, as those skilled in the art will readily understand. Such variations and modifications are considered to be within the purview and scope of the appended claims.

What is claimed is:

1. An oil-soluble organic sulfur-containing reaction product which gradually evolves hydrogen sulfide, containing between about 0.5 percent and about 20 percent by weight of said reaction product, of a reaction product obtained by reacting an aldehyde, selected from the group consisting of aromatic aldehydes, heterocyclic aldehydes and formaldehyde, with ammonia, in a proportion of about 3 moles of aldehyde to 2 moles of ammonia, at a temperature of between about 20° C. and about 100° C.

2. An oil-soluble organic phosphorus- and sulfur-containing reaction product produced by reacting pinene with phosphorus pentasulfide, in a molar proportion of about 4:1, respectively, at a temperature of between about 100° C. and about 160° C., containing between about 0.5 percent and about 20 percent, by weight of said reaction product, of a condensation product obtained by reacting formaldehyde and ammonia, in a molar proportion of about 3:2, respectively, and at a temperature of between about 20° C. and about 100° C.

3. An oil-soluble organic phosphorus- and sulfur-containing reaction product produced by reacting pinene with phosphorus pentasulfide, in a molar proportion of about 4:1, respectively, at a temperature of between about 100° C. and about 160° C., containing between about 0.5 percent and about 20 percent, by weight of said reaction product, of a condensation product obtained by reacting furfuraldehyde and ammonia, in a molar proportion of about 3:2, respectively, and at a temperature of between about 20° C. and about 100° C.

4. An oil-soluble organic phosphorus- and sulfur-containing reaction product produced by reacting pinene with phosphorus pentasulfide, in a molar proportion of about 4:1, respectively, at a temperature of between about 100° C. and about 160° C., containing between about 0.5 percent and about 20 percent, by weight of said reaction product, of a condensation product obtained by reacting benzaldehyde and ammonia, in a molar proportion of about 3:2, respectively, and at a temperature of between about 20° C. and about 100° C.

5. A lubricant comprising a major proportion of mineral lubricating oil, a minor amount, sufficient to improve the antioxidant properties thereof, of an oil-soluble organic sulfur-containing reaction product which gradually evolves hydrogen sulfide and between about 0.001 percent and about 1 percent by weight of said mineral lubricating oil of a reaction product obtained by reacting an aldehyde, selected from the group consisting of aromatic aldehydes, heterocyclic aldehydes and formaldehyde, with ammonia, in a proportion of about 3 moles of aldehyde to 2 moles of ammonia, at a temperature of between about 20° C. and about 100° C.

6. A lubricant comprising a major proportion of mineral lubricating oil, a minor amount, sufficient to improve the antioxidant properties thereof, of an oil-soluble organic phosphorus- and sulfur-containing reaction product produced by reacting pinene with phosphorus pentasulfide, in a molar proportion of about 4:1, respectively, at a temperature of between about 100° C. and about 160° C., and between about 0.001 percent and about 1 percent, by weight of said mineral lubricating oil, of a condensation product obtained by reacting formaldehyde and ammonia, in a molar proportion of about 3:2, respectively, and at a temperature of between about 20° C. and about 100° C.

7. A lubricant comprising a major proportion of mineral lubricating oil, a minor amount, sufficient to improve the antioxidant properties thereof, of an oil-soluble organic phosphorus- and sulfur-containing reaction product produced by reacting pinene with phosphorus pentasulfide, in a molar proportion of about 4:1, respectively, at a temperature of between about 100° C. and about 160° C., and between about 0.001 percent and about 1 percent, by weight of said mineral lubricating oil, of a condensation product obtained by reacting furfuraldehyde and ammonia, in a molar proportion of about 3:2, respectively, and at a temperature of between about 20° C. and about 100° C.

8. A lubricant comprising a major proportion of mineral lubricating oil, a minor amount, sufficient to improve the antioxidant properties thereof, of an oil-soluble organic phosphorus- and sulfur-containing reaction product produced by reacting pinene with phosphorus pentasulfide, in a molar proportion of about 4:1, respectively, at a temperature of between about 100° C. and about 160° C., and between about 0.001 percent and about 1 percent, by weight of said mineral lubricating oil, of a condensation product obtained by reacting benzaldehyde and ammonia, in a molar proportion of about 3:2, respectively, and at a temperature of between about 20° C. and about 100° C.

References Cited in the file of this patent

UNITED STATES PATENTS

| | | |
|---|---|---|
| 2,409,799 | Roberts | Oct. 22, 1946 |
| 2,477,244 | Gaynor | July 26, 1949 |